Oct. 18, 1960 C. J. JACKSON 2,956,814
AUTOMOBILE SUSPENSION SYSTEM
Filed Nov. 6, 1957 2 Sheets-Sheet 1
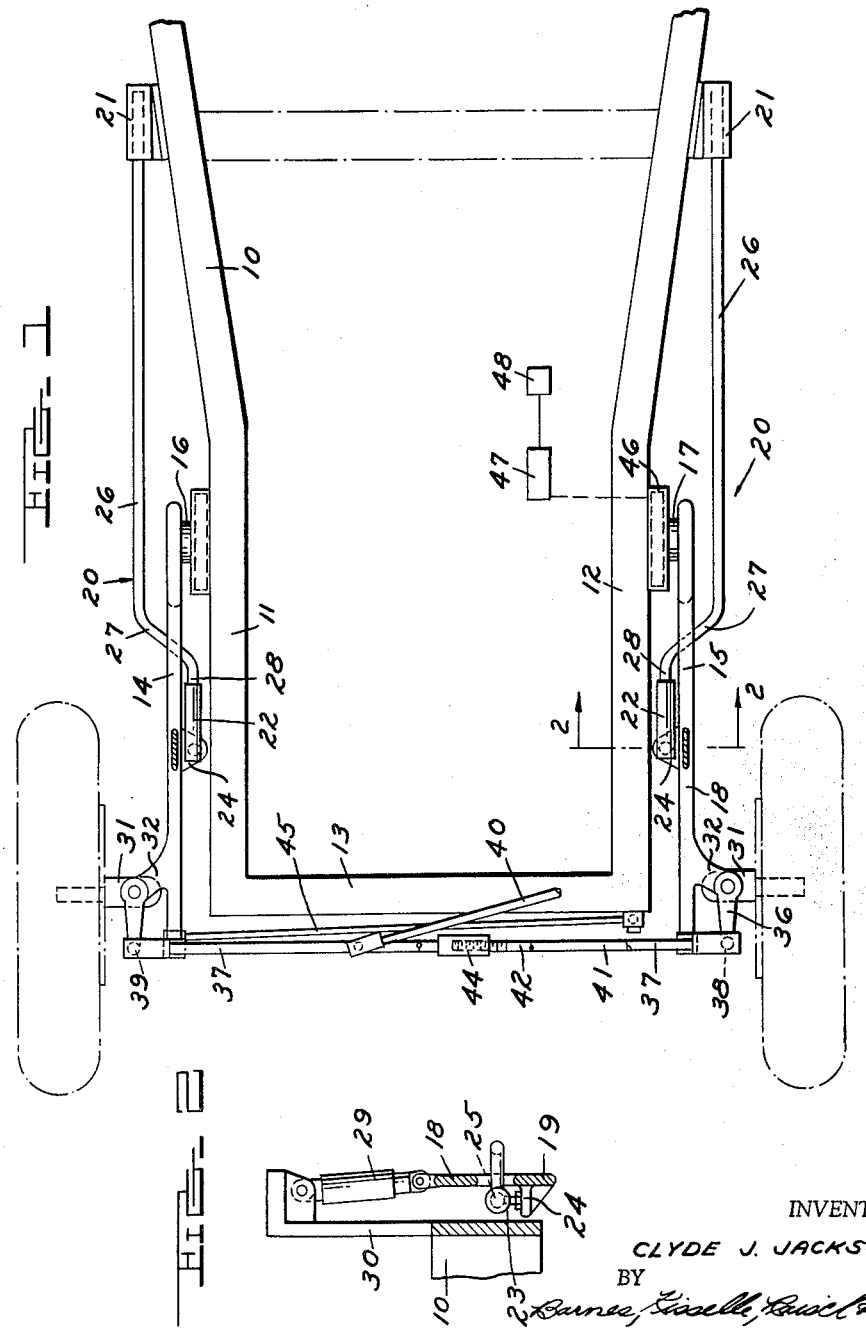
INVENTOR.
CLYDE J. JACKSON
BY
ATTORNEYS Oct. 18, 1960  C. J. JACKSON  2,956,814
AUTOMOBILE SUSPENSION SYSTEM
Filed Nov. 6, 1957  2 Sheets-Sheet 2
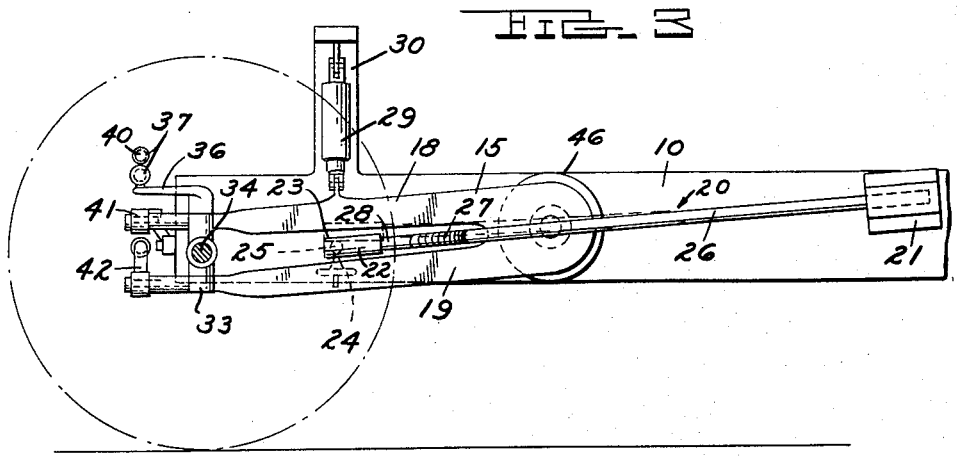
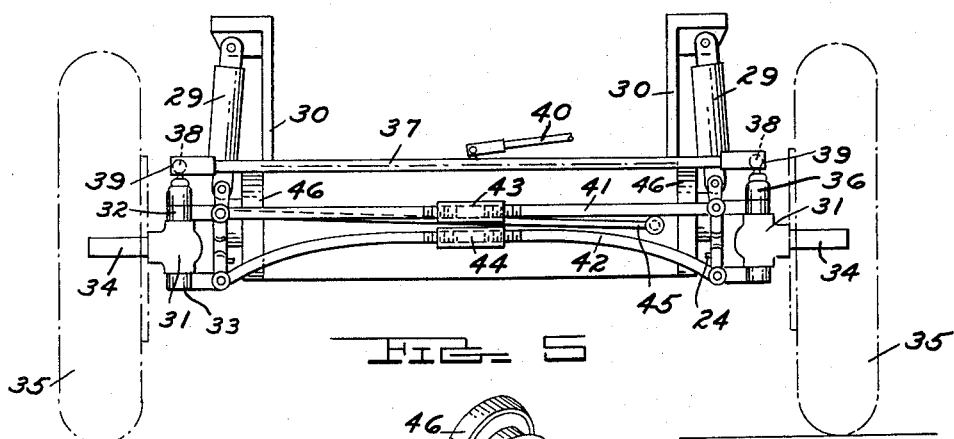
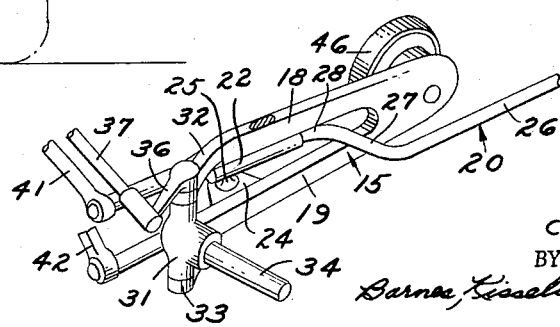
INVENTOR.
CLYDE J. JACKSON
BY
*Barnes, Kisselle, Raisch & Choate*
ATTORNEYS

United States Patent Office 2,956,814
Patented Oct. 18, 1960

2,956,814
AUTOMOBILE SUSPENSION SYSTEM

Clyde J. Jackson, Rte. 2, Albion, Mich., assignor of one-half to A. Lee Clark, Albion, Mich.

Filed Nov. 6, 1957, Ser. No. 694,775

12 Claims. (Cl. 280—124)

This invention relates to a suspension system for the front end of an automobile.

Prior art suspension systems for automobiles have utilized coil or leaf springs for supporting an axle on the ends of which the wheels are mounted for rotation and for steering motion. More recently it has been suggested that improved suspension can be obtained by utilizing a torsion bar, that is, a straight bar having one end fixed to the frame and the other end connected to the axle so that the bar is subjected to torsion as the automobile moves along the road. In all of these systems the tie rods and steering rods which interconnect the front wheels are mounted beneath the frame. This has proved a great obstacle in the efforts that are presently being made to lower the center of gravity of the automobile.

It is an object of this invention to provide a novel supporting system for the front end of an automobile.

It is a further object of this invention to provide such a system which utilizes a torsion bar of novel construction.

It is a further object of this invention to provide such a supporting system wherein the entire undercarriage of the automobile beneath the front end of the frame is clear and unobstructed.

It is a further object of this invention to provide a novel system for interconnecting the front wheels of an automobile.

It is a further object of this invention to provide a novel suspension system which permits easy adjustment of the camber of the front wheels of an automobile.

In the drawings:

Fig. 1 is a plan view of the suspension system embodying the invention.

Fig. 2 is a fragmentary sectional view taken along the line 2—2 in Fig. 1.

Fig. 3 is a side elevational view of the suspension system.

Fig. 4 is a front elevational view.

Fig. 5 is a fragmentary perspective view.

Referring to Fig. 1 the front end of the automobile frame 10 comprises a pair of parallel side members 11, 12 connected at their front ends by a laterally extending end member 13. A frames 14, 15 are pivoted to the side members 11, 12, respectively, by suitable means 16, 17 at a point spaced rearwardly from end member 13.

As shown in Fig. 3 each A frame comprises angularly spaced arms 18, 19 which extend forwardly with the free ends of the arms projecting beyond the front of end member 13 (Fig. 1).

A torsion bar 20 has one end thereof fixed to the side of the frame at a point spaced rearwardly from pivot means 16, 17 by means of a clamp 21 which holds the end of the torsion bar 20 fixed. The other end of the torsion bar is reinforced by means of a cylindrical bushing 22 and is connected to the lower arm 19 of its respective A frame by a connection which includes a ball 23 mounted on a projection 24 extending laterally inwardly from the arm 19 and received in a complementary socket 25 on the end of the torsion bar.

The torsion bar has a particular configuration which results in its being subjected to both bending and torsion. Torsion bar 20 includes a first section 26 extending generally longitudinally of the frame and a second section 27 at an angle to the first section 26 and extending inwardly toward the side of the frame 10 and between the arms 18, 19 of the A frame. Torsion bar 20 also includes a third section 28 extending generally longitudinally and forwardly from the second section. Socket 25 is mounted on third section 28.

A shock absorber 29 is provided between the frame 10 and the upper arm 18 of the A frame in order to absorb large sudden shocks. The shock absorber 29 may be of the hydraulic type and has one end thereof pivotally connected to an upstanding arm 30 on the frame and the other end thereof pivotally connected to the upper arm 18.

A steering knuckle 31 is pivotally mounted for rotation about a generally vertical axis between outwardly and forwardly extending projections 32, 33 on arms 18, 19, respectively, of each of the A frames (Fig. 5). Each steering knuckle 31 supports spindle 34 on which a front wheel 35 is rotatably mounted. A portion of the steering knuckle 31 extends upwardly through projection 32 and a generally horizontal steering arm 36 is fixed to the upper end of the knuckle 31.

A steering gear connecting rod 37 connects the ends of the steering arms 36. As shown in Fig. 5 this connection includes a ball 38 on the end of each steering arm 36 and a complementary socket 39 on each end of steering connecting rod 37. A link 40, in turn, connects the steering connecting rod 37 to the steering system of the automobile which is of conventional type.

A pair of laterally extending tie rods 41, 42 connects the free ends of the arms 18, 19 of the A frame, tie rod 41 being pivotally connected to the ends of arm 18 for movement about a horizontal axis and tie rod 42 being pivotally connected to the free ends of lower arms 19 for movement about a horizontal axis. Tie rod 41 is straight, while tie rod 42 is curved upwardly at its center. Each of the tie rods is made in two sections, the inner ends of which are threaded and connected by a threaded sleeve 43, 44, respectively, so that the tie rods are adjustable longitudinally in order to adjust the camber of the wheels.

By this arrangement a parallelogram linkage is provided between the front wheels 35 which insures that the planes of rotation of the front wheels remain in the same relative position regardless of the vertical position of the wheels. For example, as the wheel on one side is elevated relative to the frame due to, for example, going over a large obstacle, its plane does not change in its relationship to the plane of the other wheel.

A stabilizing link 45 has one end thereof pivoted to the end of lower arm 19 of one A frame and the other end is connected to the end frame member 13 by a ball and socket connection (Fig. 1) to provide lateral stability for the suspension means.

In use, as the automobile is driven along the highway, each of the A frames moves upwardly or downwardly in accordance with the contour encountered by the wheel which the A frame supports. As the position of the A frame changes relative to the automobile frame, the torsion bar 20 is subjected to both a torsion force and a bending force. The manner in which the torsion bar is subjected to bending is shown by dotted lines in Fig. 3.

A hydraulic brake 46 of conventional construction may be provided at the pivotal connection of the A frames to the automobile frame to retard the pivotal movement of the A frame when the brakes of the automobile are applied. Brakes 46 are connected to the hydraulic brake system 47 of the automobile so that when the driver operates the brake pedal 48 the brakes 46 are energized at the same time as the wheel brakes.

It can thus be seen that by the above suspension system a novel means for suspending the front wheels of an automobile is provided which results in having the underside of the frame completely unobstructed. This permits the center of gravity of the automobile to be lower.

The use of the novel torsion bar provides a more comfortable and stable ride for the occupants of the automobile.

In the above-described suspension system the linkage interconnecting the front wheels is entirely in front of the front end of the frame and is easily accessible for adjustment of the camber and the steering linkages. The ready accessibility of the several parts of the suspension system not only permits easy access for servicing but, in addition, permits easy removal and replacement of the components of the system.

I claim:

1. In an automobile suspension system, the combination comprising an automobile frame having spaced longitudinally extending side members and a laterally extending end member connecting said side members, a rigid suspension member mounted on each said side member for pivotal movement about a laterally extending horizontal axis, said suspension members extending forwardly toward said end member, means for mounting a wheel adjacent the forward end of each said suspension member for rotation about a generally vertical axis, a torsion bar on each side of said frame having one end thereof fixed to a side member at a point spaced rearwardly of the pivotal mounting of said frame member and the other end thereof connected to said suspension member, a pair of vertically spaced parallel tie rods, each tie rod having its ends pivotally attached to the front ends of said suspension members thereby forming a parallelogram linkage between said suspension members, and steering means connected to said wheel mounting means for pivoting said wheel mounting means and thereby steering the automobile.

2. The combination set forth in claim 1 including friction means adjacent said pivotal connection of each said suspension member to said side member for retarding the pivotal movement of said suspension member relative to said side member.

3. The combination set forth in claim 1 wherein said means for connecting the other end of each said torsion bar to its respective suspension member comprises a ball on said suspension member and a complementary socket on said end of said torsion rod.

4. The combination set forth in claim 3 wherein said torsion rod includes a first portion adjacent said side of said automobile frame and extending generally longitudinally of said automobile frame, a second portion at an angle to said first section and extending inwardly toward said automobile frame, and a third portion adjacent the end which is connected to said suspension member and extending generally longitudinally of said automobile frame.

5. In an automobile suspension system, the combination comprising an automobile frame having at the forward end thereof spaced parallel side members extending longitudinally of the frame and connected by an end member extending laterally of the frame, a rigid A frame on each side of said automobile frame, means for mounting said A frame on said side member for pivotal movement about a generally horizontal axis, each said A frame comprising a pair of angularly spaced arms extending forwardly, a torsion bar, means for fixing one end of said torsion bar to said automobile frame at a point spaced rearwardly from said means for pivotally mounting said A frame on said side member, means for connecting the other end of said torsion bar to its respective A frame for universal movement relative thereto, means mounted on said arms for supporting a wheel for pivotal movement about a generally vertical axis, the forward ends of said arms extending forwardly beyond said end member of said automobile frame, an adjustable tie rod connecting opposite pairs of said arms, means for pivotally connecting each end of each tie rod to its respective arm for pivotal movement about a generally horizontal axis, a stabilizing link connecting one A frame and the automobile frame, and steering means extending to said wheel mounting means for steering the automobile.

6. The combination set forth in claim 5 wherein said torsion bar comprises a first section adjacent the end thereof which is fixed to said frame, a second section extending at an angle to said first section and inwardly toward said frame, and a third section extending at an angle to said second section and generally longitudinally and forwardly.

7. The combination set forth in claim 6 wherein said means for mounting the other end of said torsion bar to said A frame for universal movement comprises a ball mounted on the lower arm of each said A frame, and a socket on the end of said torsion bar.

8. In an automobile suspension system, the combination comprising an automobile frame having spaced longitudinally extending side members and a laterally extending end member connecting said side members, a rigid suspension member mounted on each said side member for pivotal movement about a laterally extending horizontal axis, said suspension members extending forwardly toward said end member, means for mounting a wheel adjacent the forward end of each said suspension member for rotation about a generally horizontal axis and for pivotal movement about a generally vertical axis, a torsion bar on each side of said frame, means for fixing one end of said torsion bar to a side of said frame, means for connecting the other end of said torsion bar to its respective suspension member for universal movement relative thereto, said torsion bar comprising a first portion adjacent said side of said frame and extending generally longitudinally of said automobile frame, a second section at an angle to said first section and extending inwardly toward said side frame, and a third section adjacent the end which is connected to said suspension member and extending generally longitudinally of said automobile frame, said first section being of greater length than said second and third sections.

9. In an automobile suspension system, the combination comprising an automobile frame having at one end thereof a pair of spaced longitudinally extending side members and an end member connecting said side members, a suspension member mounted on each said side member for pivotal movement about a generally horizontal axis, means on said suspension member for supporting a wheel for pivotal movement about a generally vertical axis, the forward end of each said suspension member projecting forwardly beyond the end member of said automobile frame, and a pair of generally parallel vertical spaced tie rods connecting the forward ends of said suspension members, the ends of said tie rods being mounted on said suspension members for rotation about a generally horizontal axis, said tie rods and said suspension members forming a parallelogram linkage between said suspension members.

10. The combination set forth in claim 9 wherein each said tie rod is longitudinally adjustable.

11. In an automobile suspension system, the combination comprising an automobile frame having at the forward end thereof spaced parallel side members extending longitudinally of the frame and connected by an end member extending laterally of the frame, an A frame on each side of said automobile frame, means for mounting said A frame on said side member for pivotal movement about a generally horizontal axis, each said A frame comprising a pair of angularly spaced arms extending forwardly, a torsion bar, means for fixing one end of said torsion bar to said automobile frame at a point spaced rearwardly from said means for pivotally mounting said A frame on said side member, means for connecting the other end of said torsion bar to its respective A frame for universal movement relative thereto, and means mounted on said arms for supporting a wheel for pivotal movement about a generally vertical axis, said torsion bar comprising a first portion adjacent said side of said automobile frame and extending generally longitudinally of said automobile frame, a second portion at an angle to said first portion and extending inwardly between said arms of said A frame toward said side frame, and a third portion adjacent the end which is connected to said A frame and extending generally longitudinally of said automobile frame, said end which is connected to said A frame being directly connected to the lower arm of said A frame.

12. In an automobile suspension system, the combination comprising an automobile frame having at the forward end thereof spaced parallel side members extending longitudinally of the frame and connected by an end member extending laterally of the frame, an A frame on each side of said automobile frame, means for mounting said A frame on said side member for pivotal movement about a generally horizontal axis, each said A frame comprising a pair of angularly spaced arms extending forwardly, a torsion bar, means for fixing one end of said torsion bar to said automobile frame at a point spaced rearwardly from said means for pivotally mounting said A frame on said side member, means for connecting the other end of said torsion bar to its respective A frame for universal movement relative thereto, and means mounted on said arms for supporting a wheel for pivotal movement about a generally vertical axis, said torsion bar comprising a first portion adjacent said side of said automobile frame and extending generally longitudinally of said automobile frame, a second portion at an angle to said first portion and extending inwardly between said arms of said A frame toward said side frame, and a third portion adjacent the end which is connected to said A frame and extending generally longitudinally of said automobile frame, said end which is connected to said A frame being directly connected to the lower arm of said A frame, said means for connecting the other end of each said torsion bar to its respective A frame comprising a ball mounted on the lower arm of each said A frame, and a complementary socket on said end of said torsion bar.

References Cited in the file of this patent

UNITED STATES PATENTS

| | | |
|---|---|---|
| 1,396,549 | Beatty | Nov. 8, 1921 |
| 2,210,485 | Hawkins | Aug. 6, 1940 |
| 2,220,916 | Schiff | Nov. 12, 1940 |
| 2,529,806 | Konopka | Nov. 14, 1950 |
| 2,644,699 | Weiertz | July 7, 1953 |
| 2,788,222 | Wilson | Apr. 9, 1957 |
| 2,825,576 | Allison | Mar. 4, 1958 |

FOREIGN PATENTS

| | | |
|---|---|---|
| 277,792 | Italy | Sept. 19, 1930 |